United States Patent [19]

Schoepe et al.

[11] Patent Number: 5,090,066
[45] Date of Patent: Feb. 25, 1992

[54] ADAPTER FOR TOILET FITTING

[75] Inventors: Adolf Schoepe, Fullerton; Kabir Siddiqui, Yorba Linda, both of Calif.

[73] Assignee: Fluidmaster, Inc., Anaheim, Calif.

[21] Appl. No.: 565,640

[22] Filed: Aug. 10, 1990

[51] Int. Cl.$^5$ .................. E03D 1/34; E03D 1/35
[52] U.S. Cl. ............................. 4/378; 4/393; 402/344; 24/23 R; 24/22
[58] Field of Search ............... 4/378, 392, 393, 403, 4/404; 403/344; 24/205, DIG. 16, 20 R, 23 EE, 20 EE, 331, 321, 505, 500, 511, 537, 3 J, 3 M, 21, 22, 23 R; 285/373, 419, 921

[56] References Cited

U.S. PATENT DOCUMENTS

| 823,591 | 6/1906 | Eager | 285/419 |
|---|---|---|---|
| 1,464,335 | 8/1923 | Petry | 24/22 |
| 1,649,752 | 11/1927 | Stone | 285/419 |
| 1,709,743 | 4/1929 | Sagenkahn et al. | 24/22 |
| 2,474,062 | 6/1949 | Murphy | 285/419 |
| 2,741,775 | 4/1956 | Schmidt | 4/393 |
| 2,781,520 | 2/1957 | Micek | 4/393 |
| 2,821,721 | 2/1958 | Nelson | 4/392 |
| 3,435,823 | 4/1969 | Edwards | 285/419 |
| 3,456,262 | 7/1969 | Coon | 24/511 |
| 3,902,747 | 9/1975 | Weinhold | 285/419 |
| 4,103,399 | 8/1978 | Oetiker | 24/22 |
| 4,106,799 | 8/1978 | Oetiker | 24/20 R |
| 4,160,294 | 7/1979 | Crumby | 4/393 |

FOREIGN PATENT DOCUMENTS 580779  10/1976  Sweden .................. 403/344

Primary Examiner—Henry J. Recla
Assistant Examiner—Keith Kupferschmid
Attorney, Agent, or Firm—Arthur Freilich; Robert D. Hornbaker; Leon D. Rosen

[57] ABSTRACT

An assembly is provided for replacing part or all of a toilet flush valve, which facilitates mounting in a variety of toilets and which enables saving of water. The assembly includes an adapter (30, FIG. 6) for mounting on older types of overflow tubes, which includes a ring member (70) having a gap (721) and a leaf spring (80) extending across the gap. After the adapter is moved down along the overflow tube and lies at its base, the spring is pushed in to cause a hook (84) at one end to ride along a ramp (90) from a second tooth (88) to a third tooth (92) and engage the third tooth, to tightly clamp the ring member in place to prevent turning. A closing delay cup (116, FIG. 9) that can be used on a valve member, includes a plurality of holes and at least one plug (126) that is molded to the cup and can be cut off and used to plug one of the holes (120) to adjust the amount of water saved in each flushing. A valve member includes a tank ball having an enlargement (160, FIG. 12) at its top which is received in a yoke, in a universal joint that allow for limited pivoting of the tank ball to seal against valve seats of varying height and tilt.

5 Claims, 4 Drawing Sheets

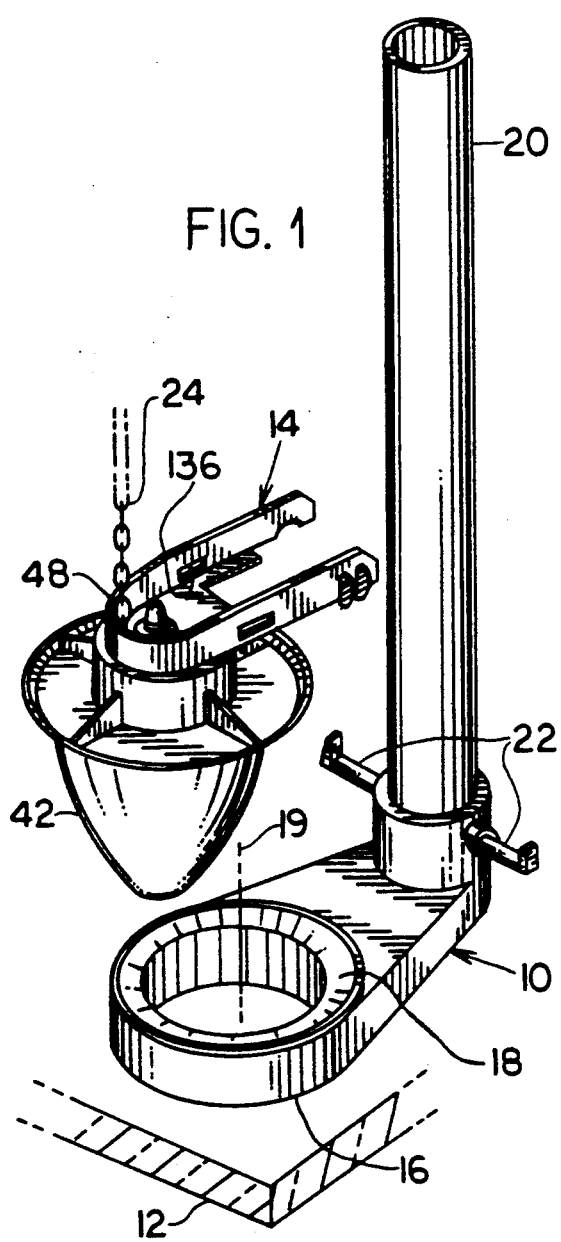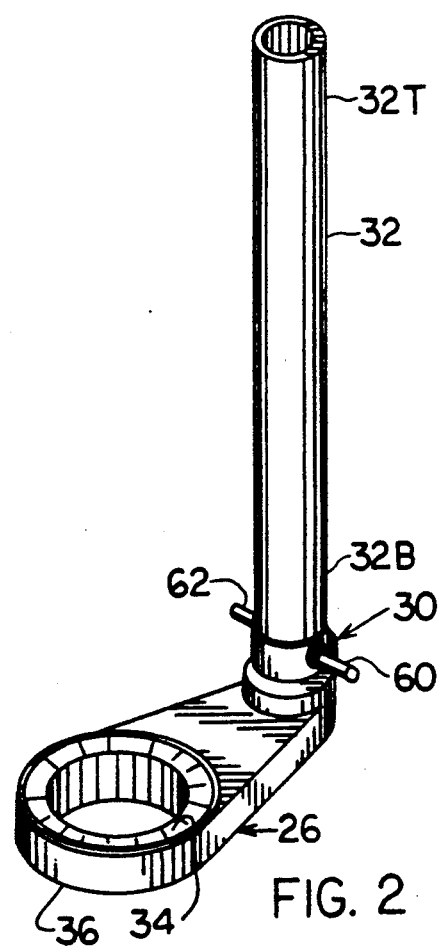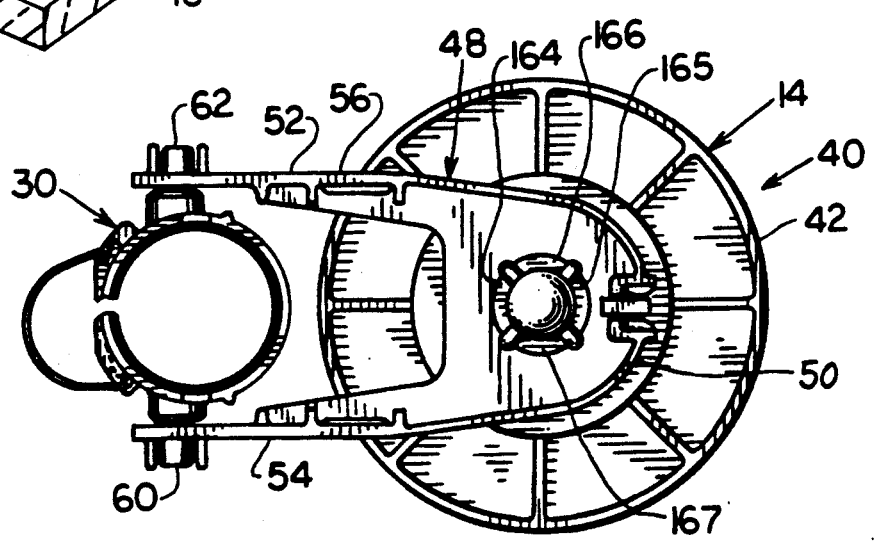

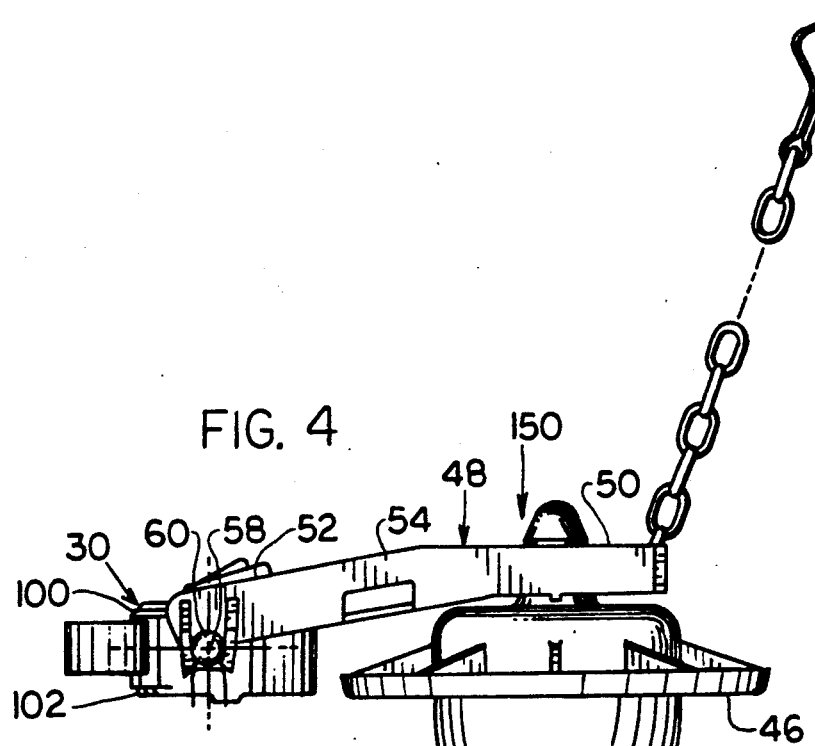
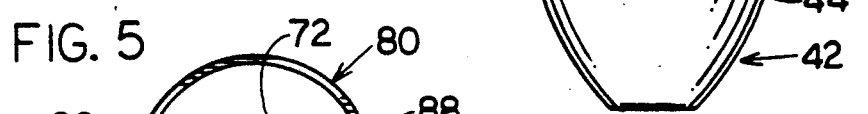
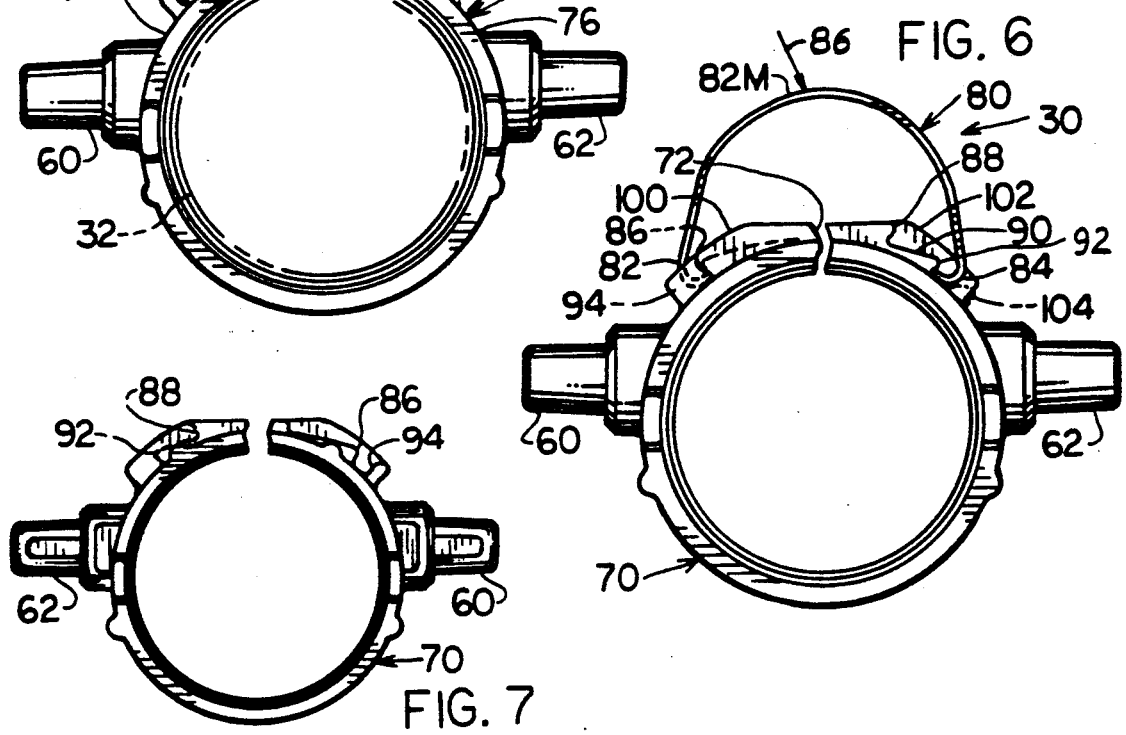

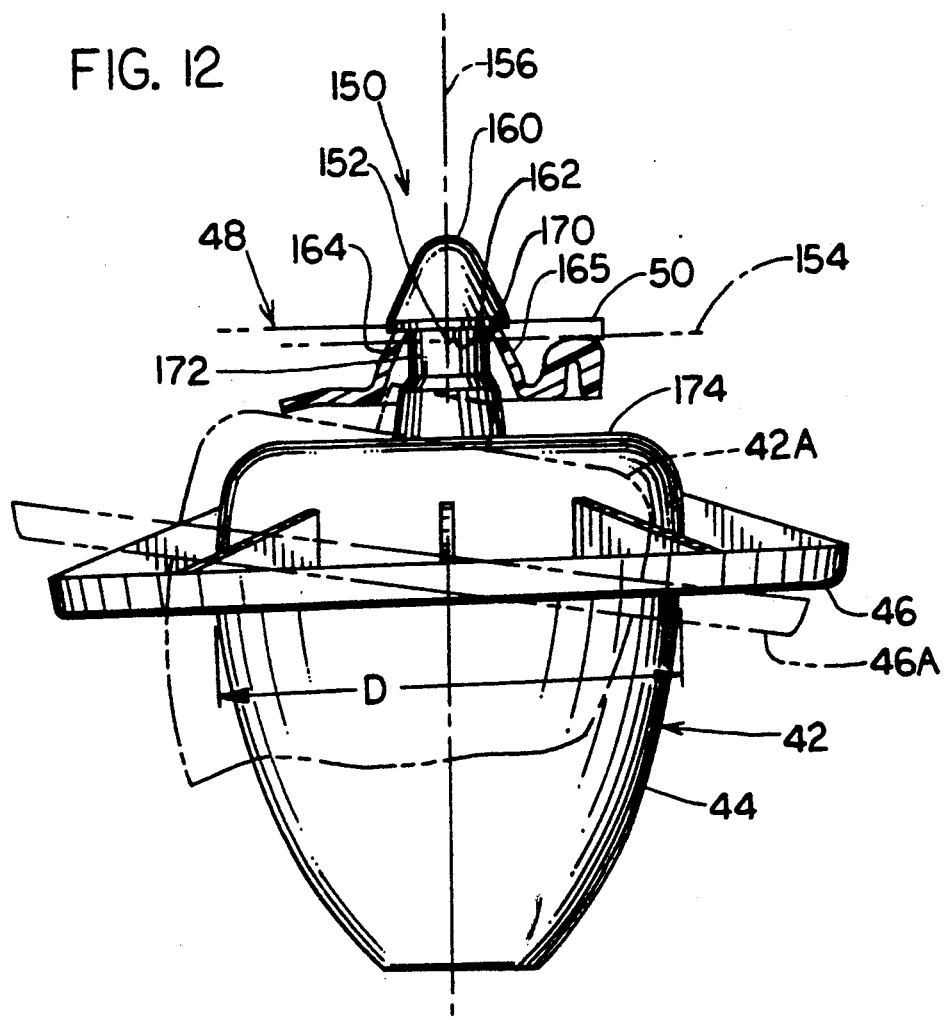

ADAPTER FOR TOILET FITTING

BACKGROUND OF THE INVENTION

Toilets generally include a water closet and a flush valve that rapidly empties most of the water from the closet into the toilet bowl to flush it. The flush valve generally includes a toilet flush fitting that is fixed in place and forms a valve seat, and a valve member that pivots up off the seat for flushing and which then moves down against the seat to seal it. The fitting also includes a tall overflow tube that extends above the level of water in the closet, and which passes a moderate amount of water immediately after each flushing to refill the toilet bowl.

Two types of toilet flush fittings are commonly found in homes. A newer type that is molded of plastic and which comprises about 60% of fittings currently in use, includes a pair of posts projecting from the base of the overflow tube to pivotally support a valve member. An older type of fitting which is generally of brass and comprises about 40% of those currently in use, does not have any mounting posts. Two general types of replacement valve members are commonly sold. One type includes a rigid plastic frame with an elastomeric sealing member. Another type is made entirely of elastomeric material and forms its own "living" hinge.

Valve members made entirely of elastomeric material have a relatively short life such as a couple of years, because the soft rubber or soft vinyl absorbs chemicals in the water supply and tends to swell. The swelling can change the length of the flapper, which moves its valve closing surface away from the valve seat and which also warps its closing surface, so a good seal is not achieved. A simple and low cost valve member assembly which could be mounted on either type of common toilet flush fitting (with or without mounting posts), which provided a rigid plastic yoke to pivotally support the tank ball, and which could be easily and reliably installed, would be of considerable value.

Some types of replacement flush valves include a valve seat member that fits over the existing valve seat, to replace a corroded or worn valve seat. Such a valve also includes a pivoting valve member, which can be of the same construction as the type of valve member meant to pivotally mount on the refill tube. Where the water closet is of low capacity such as 3.5 gallons, insufficient water may be dispensed to achieve complete flushing, and double flushing may be required. Double flushing can often be avoided by attaching a delay cup to the valve member, which delays closing of the flush valve so more water from the water closet is dispensed in each flush cycle. However, it is often desirable to allow adjustment of the delay cup so not too much nor too little water is dispensed in each cycle, to save water while achieving complete flushing. U.S. Pat. No. 4,907,302 shows a valve member with stops of variable sizes that limit the angle by which a valve member with a delay cup can pivot, with the stops being easily cut away to control the amount of water dispensed in each cycle. Apparatus which enabled fine adjustment of the amount of dispensed water and which was easier to adjust, would be of considerable value.

Replacement valve members of the type that include a soft rubber tank ball mounted on a rigid plastic yoke, can assure long, reliable closing against an existing flush valve seat. However, valve seats lie at slightly different heights relative to the joints that pivotally support valve members, and some valve seats are tilted slightly. A low cost valve member which had a tank ball that could seal against such seats of variable height and tilt would be of considerable value.

SUMMARY OF THE INVENTION

In accordance with one embodiment of the present invention, an adapter (30, FIG. 6) is provided for use in pivotally mounting a valve member on a toilet flush fitting, wherein the adapter can be easily and securely installed. The adapter includes a ring member (70) constructed to closely surround an overflow tube, the adaptor having mounting posts (60, 62) for pivotally supporting a valve member. The ring member has a gap (72) and has first and second spring retainers (86, 88) on opposite sides of the gap. A spring extends across the gap and has ends mounted on the first and second spring retainers. The ring member can also have a third spring retainer (92) lying further from the gap than the second retainer. An end of the spring can be moved from the second to the third retainer after the ring has been pushed down along the overflow tube and lies at its base, to securely hold the adapter against rotation. The third retainer also allows the adaptor to fit tightly on overflow tubes of different diameters.

A valve member that can mount on the posts of the adapter, includes a ridged plastic yoke (48, FIG. 8) with an inner end forming arms for mounting on the posts and with an outer end that holds an elastomeric tank ball (42). The rigid plastic yoke can also be mounted on a separate valve seat member (110), instead of the refill tube of the flush fitting. This provides room for mounting a closing delay cup (116) on the valve member. The closing delay cup can be made of variable delay, by forming a plurality of holes (120-123, FIG. 10) in the cup and by providing at least one plug (126) that can plug a hole. The plugs are preferably molded integrally with the cup, on a web (130) that can be easily cut to use the plug.

A valve member includes a rubber tank ball with an enlargement (160, FIG. 12) at its top that is received in a universal joint formed at the outer end of a rigid yoke. The joint allows the tank ball to pivot about horizontal axes so the axis (156) of the tank ball can tilt to align its seating surface (46) to seal against valve seats of different heights and/or which are tilted.

The novel features of the invention are set forth with particularity in the appended claims. The following description when read in conjunction with the accompanying drawings.

BRIEF DESCRIPTION OF THE DRAWINGS

FIG. 1 is a perspective exploded view of a valve member of the present invention, showing how it can be mounted directly on a newer type toilet flush fitting.

FIG. 2 is a perspective view of an adapter constructed in accordance with the invention, shown mounted on an older type toilet flush fitting.

FIG. 3 is a plan view of the valve member of FIG. 1 mounted on the adapter of FIG. 2.

FIG. 4 is a side elevation view of the assembly of FIG. 3.

FIG. 5 is a plan view of the adapter of FIG. 3, shown prior to locking onto an overflow tube.

FIG. 6 is a plan view of the adapter of FIG. 5, shown after it has been locked onto an overflow tube.

FIG. 7 is a bottom view of the adapter of FIG. 5, without the spring thereon.

FIG. 12 is a partial sectional view of the assembly of FIG. 4.

DESCRIPTION OF THE PREFERRED EMBODIMENT

Figure 8:
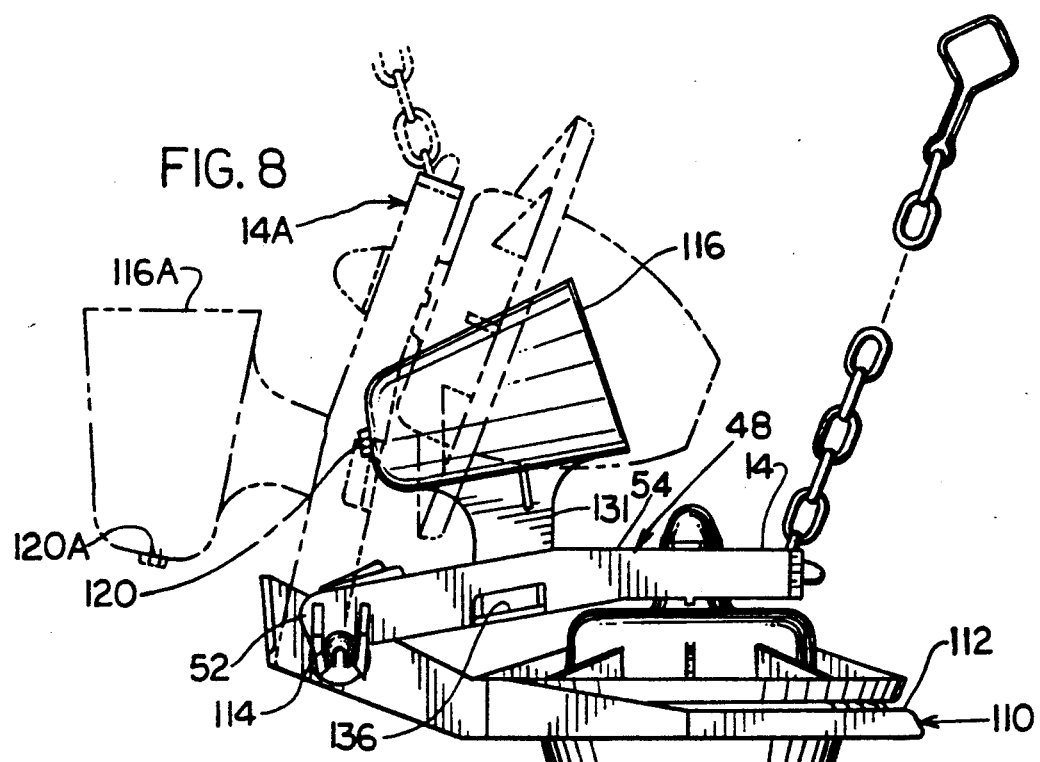
FIG. 8 is a side elevation view of the valve member of FIG. 1, shown mounted on a valve seat member, and with a closing delay cup of the present invention mounted on the valve member.
Figure 9:
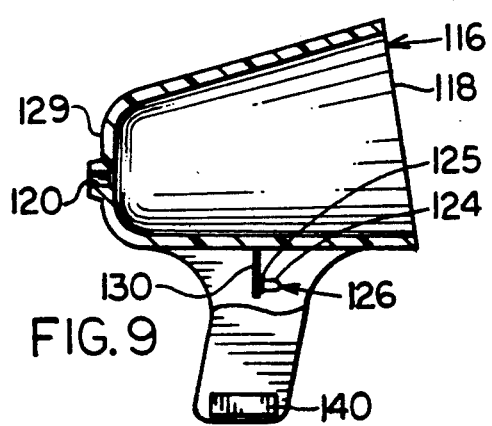
FIG. 9 is a sectional view of the closing delay cup of FIG. 8.

FIG. 1 illustrates a prior art toilet flush fitting 10 mounted on a water closet 12, and which can support a valve member 14. The fitting includes a bottom part 16 that forms a valve seat 18 centered on a vertical axis 19 and also includes an overflow tube 20 extending up to a level above the high water mark of water in the water closet. A pair of mounting posts 22 are formed at the base or bottom of the overflow tube, for pivotally supporting the valve member 14. When a chain 24 attached to the valve member is pulled, the valve member moves off the valve seat 18 to allow most of the water in the water closet to pass down through the valve seat into a toilet bowl (not shown) to flush it. As the level of water in the closet drops, the valve member 14 moves down against the valve seat to close it. For perhaps a minute thereafter, while the water closet is refilled, some water passes into the top of the overflow tube 20 and into the toilet bowl to refill it.

Valve members 14 sometimes have to be replaced. The flush fitting 10 is a type molded of plastic, with the mounting posts 22 molded in place, which enables each replacement of the valve member. About 60% of toilet flush fittings currently in place in the U.S. are of this type. However, about 40% of flush fittings currently in place in the U.S. are of a type shown at 26 in FIG. 2, which are formed of brass and do not have mounting posts. It is noted that FIG. 2 shows an adapter 30 of the present invention mounted on the overflow tube 32 of the flush fitting, to enable the valve member 14 of FIG. 1 to be mounted on the older type fitting to close the valve seat 34 on the bottom part 36 of the fitting.

A popular type of replacement valve member is the "flapper" type which is formed entirely of soft rubber or vinyl. A "flapper" includes not only the valve closing part that moves against the valve seat, but also includes a mount that attaches to a flush fitting and which includes an integral flexible part that serves as a pivot joint. However, such soft rubber or soft vinyl replacement valve members absorb chemicals from water, causing swelling and resulting in the valve not closing properly after a short lifetime such as two years. The valve member of the type shown at 14 includes a rigid plastic yoke 48 for supporting a soft elastomeric tank ball 42, which results in a long lifetime of use.

FIGS. 3 and 4 show some details of the assembly 40 of the valve member 14 and adapter 30. The valve member includes a soft elastomeric tank ball 42 forming a float 44 that floats in the water to keep the valve member up after it has been pulled up. The valve member also includes a seating surface 46 that seals against the valve seat when the valve member pivots down. The valve member also includes a yoke 48 formed of rigid plastic that is much more rigid than that of the tank ball 42, and that pivotally supports the tank ball on mounting posts. The yoke includes an outer portion 50 that supports the tank ball, and an inner portion 52 with a pair of arms 54, 56 that can be pivotally mounted about an axis 58 on a pair of mounting posts 60, 62 of the adapter 30.

The adapter 30 is designed so it can be supplied with each valve member 14, to allow the valve member 14 (which includes a rigid plastic yoke for reliability) to be mounted on either the old brass type fitting without mounting posts, or the newer type plastic fitting with posts (in which case the adapter is discarded). By supplying an adapter that will be discarded about half of the time, the manufacturer and retailer of the valve member has to stock only one type of valve member assembly, and the repairman does not have to be concerned about which type of replacement kit to buy to replace almost any type of valve member. However, such inclusion of the adapter requires that the adapter be constructed at low cost. It is important that the adapter be easy to install, and that it hold tightly to the refill tube so it does not rotate about the overflow tube and cause the valve member to not seat properly on the valve seat. The bottom of the overflow tube lies about one foot under water in a relatively narrow water closet, and it is difficult for a handyman to turn a screwdriver or the like at the bottom of the water closet.

As shown in FIG. 5, the adapter 30 includes a ring member 70 that is constructed to closely surround the refill tube, the ring member having opposite sides and having the posts 60, 62 projecting from the sides. The ring member has a gap 72 and has first and second portions 74, 76 on opposite sides of the gap. A curved leaf spring 80, curved in substantially a 180 degree loop, extends across the gap. The spring has first and second ends 82, 84 bent in largely 180 degree loops of small radius of curvature to form hooks. The hooks are initially mounted on first and second spring retainers 86, 88, in the form of teeth, located on the first and second portions of the ring member.

In the configuration of FIG. 5, the leaf spring 80 tends to close the gap 72 of the ring member with only a low force. The force is low enough that a person can slip the adapter over the top end 32T (FIG. 2) of a small outside diameter (one inch) overflow tube and can push the adapter down along the overflow tube to its lower or bottom end 32B. The valve member 14 is then mounted on the posts 60, 62 of the adapter, and the toilet is flushed to make sure that the valve member seats properly. The adapter can be turned slightly, if necessary, to assure that the valve member will seat properly.

When the installer sees that the adapter is in the proper position, he can further tighten the adaptor on the overflow tube. To do this, the installer presses on the middle 82M (FIG. 6) of the spring, as along the arrow 86, to force the second end or hook 84 of the spring to move from the second retainer or tooth 88, along a guiding surface or ramp 90, into engagement with a third retainer or tooth 92. The third retainer 92 is further from the gap 62, so the spring pulls the ring member portions on opposite sides of the gap closer together to grip the overflow tube very firmly and therefore lock it in place. The adapter is then very resistant to movement, especially to slight rotation about the overflow tube that it surrounds, to thereby assure that the valve member will continue to move down accurately against the valve seat.

The only manipulation that the installer may perform to further tighten the adapter after he pushes it down along the overflow tube, is to push on the middle of the spring until he feels that the second spring end has snapped into the third retainer 92. For most people, this operation is not too difficult to perform, even near the bottom of a narrow water-filled water closet. However, applicant has found that some people have difficulty in moving the second spring end onto another retainer, after the adaptor has been pushed down to the base of the overflow tube. Though it is desirable to fully tighten the adaptor, it is not necessary because in most cases the untightened adaptor will hold tight enough to maintain good valve closing over a long lifetime of use.

It is noted that as the middle of the spring is pushed, the first spring end 82 tends to move away from the gap, but it is prevented from doing so by a stop 94. The portions of the ring member on opposite sides of the gap also include side walls 100, 102 that prevent the leaf spring from sliding up or down off the ring member. The ring member can be injection molded of relatively hard plastic, and the spring is preferably formed of stainless steel.

The third retainer 92 is useful not only to tighten the installed adaptor, but also to enable the adaptor to be installed on overflow tubes of different diameter. Most overflow tubes already installed in the United States have an outside diameter of one inch. However, a large number have slightly larger diameters, with a large majority in the range of one to one and one-eighth inch, and with almost all being in the range of one inch to one and one-quarter inch. The ability to tighten the adaptor is useful for its installation on such different size overflow tubes.

In one example, the adaptor can be sold with the second spring end on the second retainer, as shown in FIG. 5, suitable for installation on overflow tubes of 1⅛ to 1¼ inch diameter. For installation on smaller tubes of 1 to 1⅛ inch diameter, the second spring end is first moved to the third retainer as shown in FIG. 6. Such movement of the spring end is easily accomplished before the adaptor is slid down underwater to the base of the overflow tube. If it is desired to very securely hold the adaptor in place, a fourth retainer can be provided as indicated at 104, and the second spring end can be moved to the fourth retainer after the adaptor has been slid down. To simplify installation where a wire guide lies on the overflow tube, or the overflow tube is badly corroded, the leaf spring may be removed from the plastic ring prior to installation. The ring is slipped around the base of the overflow tube, and then the leaf spring is replaced on the ring.

The valve member 14 shown in FIGS. 3 and 4, can be mounted not only on mounting posts on the overflow tube or on an adapter on the overflow tube, but can be mounted on a seat member shown at 110 in FIG. 8. The seat member 110 is designed to mount directly on the valve seat of an existing toilet flush fitting, with the member 110 having an upper surface 112 forming a valve seat. The member is especially useful where the original valve seat has corroded. The seat member has posts 114 on which the pivot ends 52 of the valve member 14 can be mounted. When mounting the seat member at 110, it is oriented so its posts 114 do not interfere with the overflow tube of the toilet valve fitting. When the valve member 14 is mounted on a separate seat member 110, a closing delay cup 116 can be mounted on the valve member 14, to delay closing of the flush valve and therefore allow additional water to be dispensed from the water closet into the toilet bowl to achieve better flushing.

The use of a closing delay cup to allow more water to be dispensed in each flushing cycle, is known, as shown in U.S. Pat. No. 4,907,302. During flushing, water in the water closet rapidly drops until it reaches a level of several inches above the bottom of the valve seat, when the rush of water causes the tank ball 42 to be dragged downwardly and close the flush valve. If the water closet is of small capacity, such as 1½ to 3½ gallons, insufficient water may be dispensed to properly flush solids out of the toilet bowl. The closing delay cup fills with water in each cycle, and in the open position of the valve at 14A, the weight of water in the cup at 116A prevents closing of the valve. The cup has holes at 120A through which water can drain out of the cup to lighten it, and allow the valve member to close, but at a later time.

The amount of delay and therefore the amount of additional water which is dispensed from the water closet in each cycle, is determined by how fast water drains out of the hole 120A of the cup. In some situations, it is desirable to delay closing of the valve by attaching the closing delay cup, but to cause only a small delay so as to dispense only a small additional amount of water. This results in conserving water, because only a small additional amount of water is dispensed, instead of the entire contents of the water closet down to the level of the valve seat.

Figure 10:
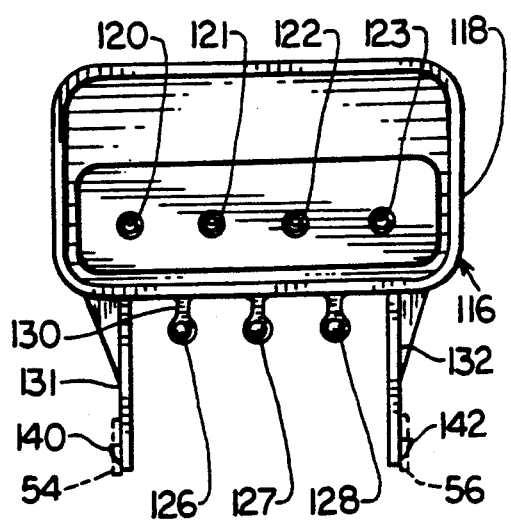
FIG. 10 is a front elevation view of the closing delay cup of FIG. 9.
Figure 11:
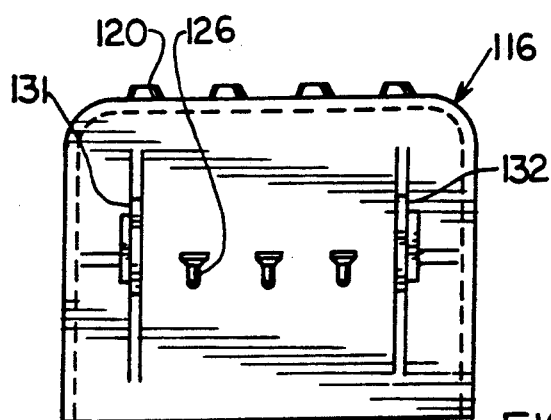
FIG. 11 is a bottom view of the closing delay cup of FIG. 10.

In accordance with the present invention, the closing delay cup 116 (FIG. 10) is provided with a bucket portion 118 having a plurality of holes 120-123 and with plugs 126-128 which can plug one or more of the holes. Each of the plugs is formed at the end of a thin tab 130 that is molded integrally with the cup and plugs, with each of the tabs being easily cut with a scissors. If insufficient water is dispensed, a person installs a closing delay cup on the valve member. If there is still insufficient flushing, he can cut one of the tabs 130 and install a plug such as 126 in one of the holes such as 120. If the toilet still does not flush properly, the person can cut another tab and install another plug, and can continue this until all three plugs are used to plug three of the four holes. If, after installing a plug and plugging some of the holes it is found that the toilet flushes properly, but at a later date it is necessary to reduce water consumption, one of the plugs can be removed. Thus, in regions of the U.S. where water saving is of high priority, the cup apparatus of the prevent invention enables adjustment of the amount of water dispensed in each cycle to attain adequate flushing using the minimum amount of water. The provisions of tiny plugs to plug holes in the delay cup, makes it obvious how adjustment can be accomplished.

The closing delay cup 116 includes a pair of legs 131, 132 forming a mount that supports the bucket portion 118 on the arms 54, 56 of the yoke 48 of the valve member. The legs of the yoke have slots 136, and the cup apparatus has a pair of projections 140, 142 that fit into the slots.

The tank ball 42 (FIG. 4) is mounted on the outer portion 50 of the yoke 48 in a universal joint 150. The joint 150 (FIG. 12) allows the tank ball to pivot a limited amount about two horizontal axes such as 152, 154. This allows the largely vertical axis 156 of the tank ball to tilt by a limited angle such as 10 degrees, in any direction from the vertical. The ability to tilt allows the seating surface 46 of the tank ball to accurately seal on a variety of valve seats.

Valve seats vary in height with respect to the axis of pivoting (e.g. 58 in FIG. 4) of the yoke's inner end. Also, some valve seats are oriented with their axis (e.g. 19 in FIG. 1) angled from the vertical. The universal joint 150 (FIG. 12) that couples the tank ball to the yoke, allows the tank ball to tilt so its axis 156 comes into alignment with the axis of the valve seat. The alignment occurs even if the height of the valve seat is somewhat different than usual (e.g. one-half inch higher or lower), or the valve seat axis is moderately titled (e.g. 10 degrees) from the vertical. It is noted that the diameter D of the tank ball float 44 at the level of the seating surface 46 is much less (e.g. three-quarters inch less for a 3 inch diameter float) than the usual diameter of the valve seat it will seal against. This assures that the float will not snag on the inside of the valve seat.

As shown in FIG. 12, the tank ball 42 has an enlargement 160 at its upper end, and has a largely downwardly-facing shoulder 162 at the bottom of the enlargement. The yoke has four resilient tabs 164–167 (166 and 167 are shown in FIG. 3) with upper edges 170 that abut the shoulder. The tank ball is installed by pressing the enlargement 160 up through the space between the yoke tabs until the upper edges of the tabs snap below the shoulder 162. The enlargement 160 is held on an upstanding post 172. There is a space between the bottom of the tabs and the post, and a space between the bottom of the yoke and the top 174 of the float, which enables limited tilting of the float on the enlargement. Actually, when the tank ball tilts to the position 42A, it tilts about the top of the tab 165 which lies on the enlargement shoulder. The tank ball can also float up and down with respect to the yoke. The sealing surface of the tilted tank ball is shown at 46A. Thus, the valve member can easily pivot to assure that the sealing surface 46 seals against valve seats of different heights and/or which are tilted.

Thus, the invention provides replacement flush valve apparatus, including an adapter for mounting a valve member on an overflow tube that does not have appropriate mounting posts. The adapter includes a ring member that can extend closely around an overflow tube, but which has a gap, and a spring that extends across the gap and pulls the portions on opposite sides of the gap together. The spring has opposite ends, with a second end of the spring initially engaged with a second retainer. The adaptor can be constructed so the second spring end is attachable instead to a third retainer located further from the gap than the second retainer, to apply greater spring force tending to close the gap. The ability to apply more gap-closing force can be used to force the ring member to be gripped more tightly on the overflow tube after installation thereon, or to obtain moderate gripping force on overflow tubes of different diameters. The invention provides a closing delay cup whose delay is easily adjustable. The cup has a plurality of drain holes and also includes at least one plug for plugging a hole to increase the delay and cause more water to be dispensed in each flushing. The valve member can include a tank ball mounted on the outer end of a yoke, in a universal joint that allows the largely vertical axis of the tank ball to tilt, to seal against valve seats of varying height and/or tilt.

Although particular embodiments of the invention have been described and illustrated herein, it is recognized that modifications and variations may readily occur to those skilled in the art, and consequently, it is intended that the claims be interpreted to cover such modifications and equivalents.

We claim:

1. An adapter for use on a toilet fitting of the type that has an overflow tube and that has a bottom part forming a valve seat, comprising:

a ring member constructed to closely surround said overflow tube and having opposite sides and a pair of mounting posts projecting from said opposite sides for pivotally supporting a valve member, said ring member having a gap and first and second opposite sides of said gap, said ring member also having a first spring retainer on said first side and first and second teeth on said second side with said second tooth lying further from said gap than said first tooth;

a spring extending across said gap and having first and second spring end portions mounted respectively on said first spring retainer and and on one of said teeth;

said spring comprises a leaf spring whose second end portion forms a hook, said leaf spring being curved sufficiently and having a middle which is spaced far enough from said ring member, that said middle can be pressed by hand largely toward said ring member to cause said second spring end to slide from said first tooth onto said second tooth.

2. A method for mounting the arms of a toilet flush valve member on the upstanding overflow tube of a toilet flush fitting, comprising:

installing an adapter having a ring member with a gap and a pair of mounting posts and also having a spring that includes first and second ends and that bridges the gap, around the top of said overflow tube, and pushing said adapter down along said overflow tube to fit closely around said overflow tube near the bottom thereof;

said ring member having a first retainer on a first side of said gap and second and third retainers on an opposite second side of said gap, with said third retainer lying further from said gap than said second retainer;

moving said second spring end into engagement with said third spring retainer, to cause said ring member to tightly grip said overflow tube;

installing the arms of a toilet flush valve member on said mounting posts to allow said valve member to pivot thereon;

said spring extending in an arc between its opposite ends that leaves a middle of the spring spaced from the ring, and said step of moving includes pressing on said middle.

3. The method described in claim 2 wherein:

said second and third retainers are formed by second and third teeth and said ring member includes a guiding surface extending between said teeth;

said spring comprises a curved leaf spring with a middle and with a hook at said second end that engages one of said teeth;

said step of moving includes pressing said middle of said spring toward said teeth to move said hook from said second tooth align said guiding surface into engagement with said third tooth.

4. An adapter for use on a toilet fitting tube comprising:
- a ring member constructed to closely surround said tube, said ring member having a gap and having a first portion on a first side of said gap and a second portion on a second side of said gap;
- a curved leaf spring extending across said gap and having first and second spring ends mounted respectively on said first and second portions;
- said leaf spring being curved in largely a 180° loop between said first and second ends thereof, to thereby urge said ends together with high resilience;
- said second portion forms a first tooth and said ring member has a second tooth lying on said second portion at a location further from said gap than said first tooth, said spring having a middle and being convexly curved sufficiently that when said middle is pressed by hand substantially toward said gap, said second spring end is moved from said first tooth to said second tooth.

5. An adapter for use on a toilet fitting tube comprising:
- a ring member constructed to closely surround said tube, said ring member having a gap and having a first portion on a first side of said gap and a second portion on a second side of said gap;
- a curved leaf spring extending across said gap and having first and second spring ends mounted respectively on said first and second portions;
- said leaf spring being curved in largely a 180° loop between said first and second ends thereof, to thereby urge said ends together with high resilience;
- said first portion comprises a first tooth, and said first spring end comprises a first hook engaged with said first tooth.

* * * * *